May 20, 1941.  E. B. MOORE  2,242,799
HEAT SEALING ENVELOPE MACHINE
Filed Sept. 24, 1936   5 Sheets-Sheet 1

INVENTOR
EDMUND B. MOORE.
BY
ATTORNEY

May 20, 1941.  E. B. MOORE  2,242,799
HEAT SEALING ENVELOPE MACHINE
Filed Sept. 24, 1936  5 Sheets-Sheet 2
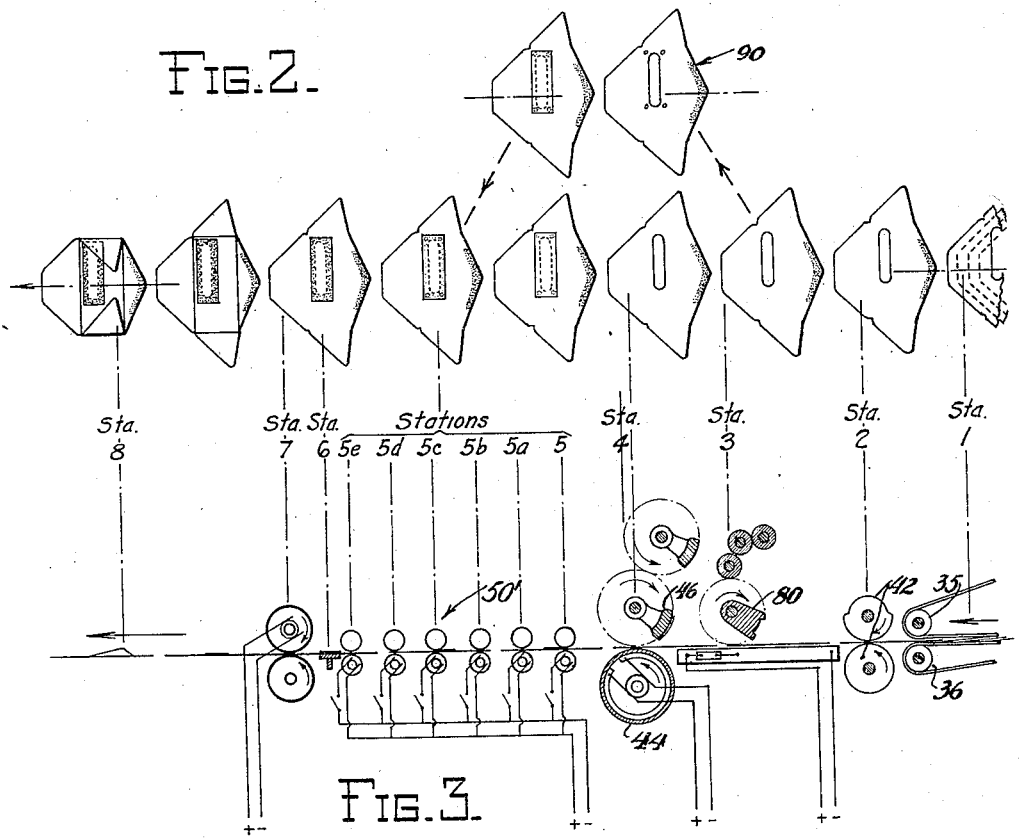
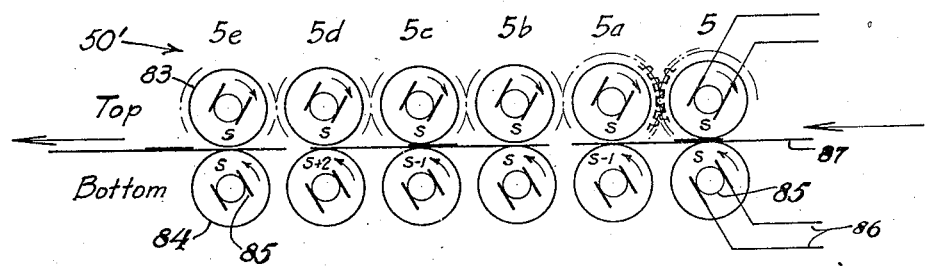
| | Pair No. | | | | | |
|---|---|---|---|---|---|---|
| | 5e | 5d | 5c | 5b | 5a | 5 |
| Speed | S+S | S+S+2 | S+S-1 | S+S | S+S-1 | S+S |
| Pressure | xp | p+x+y | p-x | p+x | p-x | p |
Fig. 5.
INVENTOR
EDMUND B. MOORE.
BY
ATTORNEY May 20, 1941.  E. B. MOORE  2,242,799
HEAT SEALING ENVELOPE MACHINE
Filed Sept. 24, 1936  5 Sheets-Sheet 3

INVENTOR
EDMUND B. MOORE.
BY
ATTORNEY

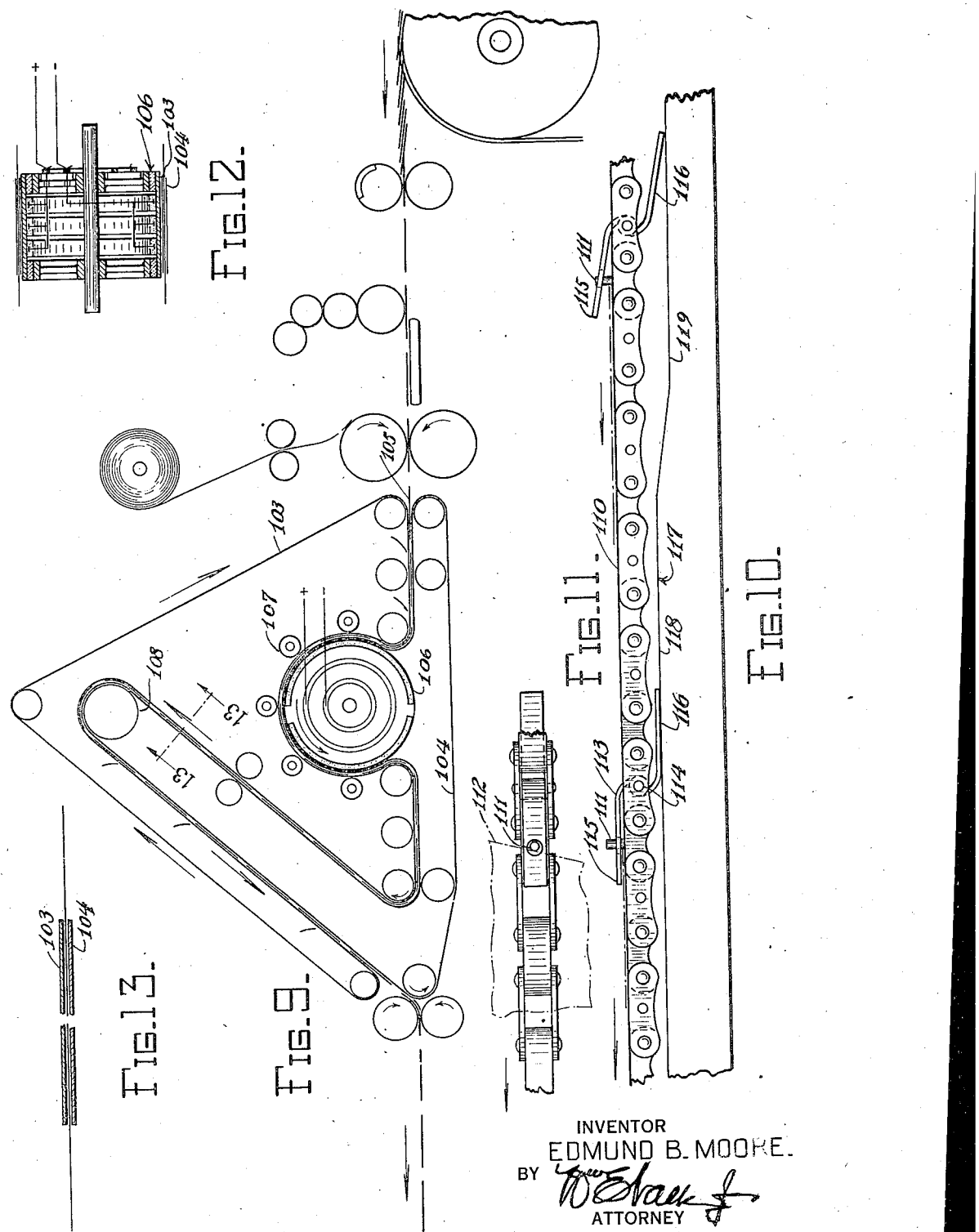

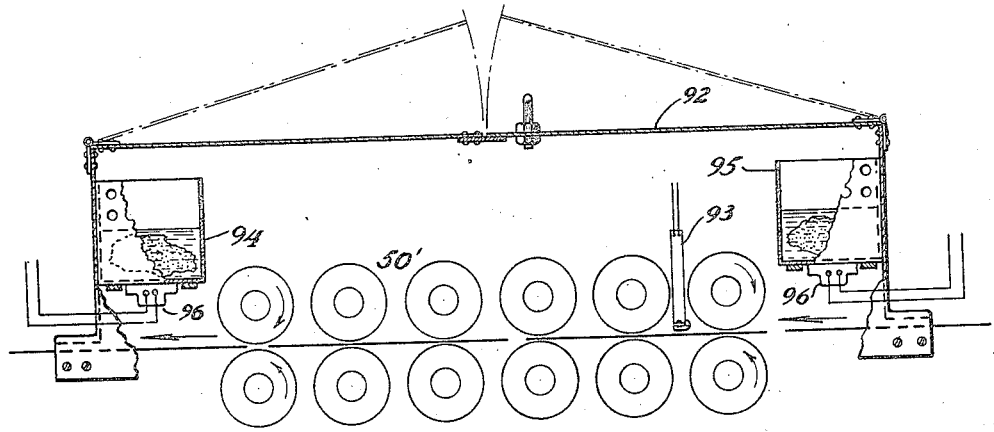
Fig.14.
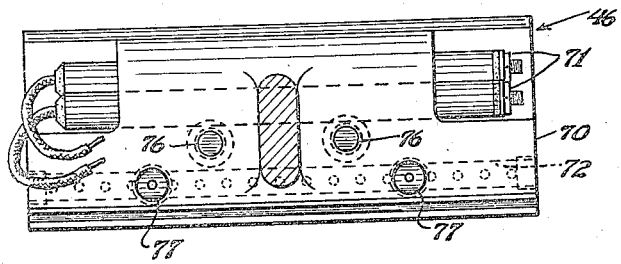
Fig.15.
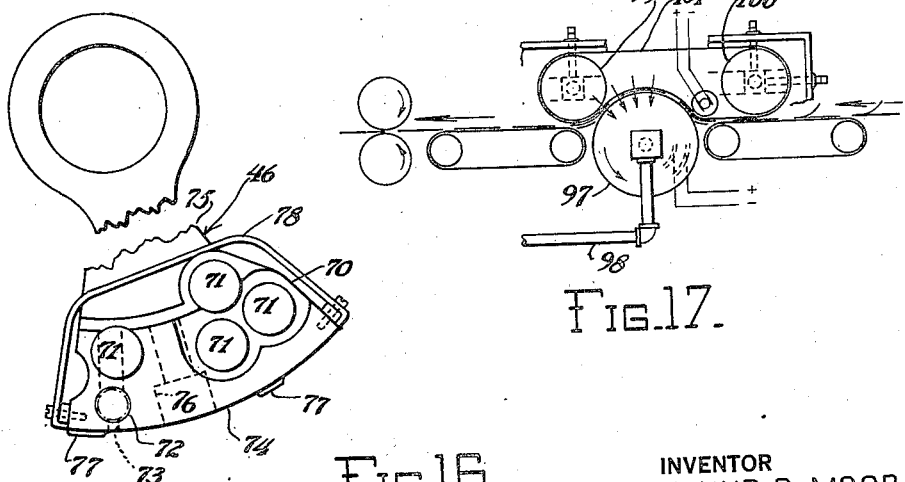
Fig.16.
Fig.17.
INVENTOR
EDMUND B. MOORE.
BY
ATTORNEY Patented May 20, 1941

2,242,799

UNITED STATES PATENT OFFICE 2,242,799

HEAT SEALING ENVELOPE MACHINE

Edmund B. Moore, Brooklyn, N. Y.

Application September 24, 1936, Serial No. 102,275

7 Claims. (Cl. 93—61)

This invention relates to envelope machinery, and is particularly concerned with improvements in envelope machines of the continuous rotary type, as differentiated from the slower, plunger type machines. Such machines are capable of very high production—on the order of ten to twelve thousand envelopes per hour, so long as the gum sealing apparatus utilized in the machine is operating properly. However, when production rates are stepped up, the gum sealed type of machines have a tendency to become jammed by the rapid accumulation of minute amounts of surplus gum and paper dust which accumulate on the various rollers of the machine as the envelopes are processed.

The present invention contemplates improvements in machines of this type to eliminate the gum sealing process, and substitutes in lieu thereof a heat-sealing process, wherein the paper is treated in its passage through the machine or where the blanks or rolls are pre-treated before being placed in the machine so that when certain edges of the envelope are brought into overlapping contact, and when pressure, heat and temperature are properly applied singly or together for the necessary time intervals, an effective seal is made between the paper parts. The preparation of the paper for this heat-sealing process involves certain chemical treatment, along with processing as to humidity and temperature, but no surplus chemical treatment occurs in the individual envelopes or blanks passing through the machine, and there is no extrusion of excess material as in the gum type machines which can cause clogging and slowing up of production. Numerous attempts have been made in the past to accommodate the heat-sealing process to high speed rotary envelope machines without any appreciable success. This lack of success, I believe, is due in some degree to a lack of appreciation of the requirements for proper heat-sealing which essentially comprises the proper processing of the paper stock either in blanks or continuous rolls and, in the actual sealing process, in applying adequate heat, under adequate pressure, for a definite length of time under appropriate humidity conditions. With inadequate heat, or with inadequate pressure, or with inadequate time or improper humidity, a properly heat-sealed joint in the paper may not be accomplished, and thus, the envelope is a faulty article of manufacture. In my invention, of which I show several alternate forms, I provide means by which adequate heat, pressure, time and humidity are introduced into the process by which an effective seal is produced. The invention is so organized that it may be incorporated in existing types of rotary envelope machinery. It is possible by its use, to practically double the production of envelopes from a rotary machine, stepping production from about twelve thousand up to a rate of fourteen thousand to twenty-eight thousand envelopes per hour, and at the same time producing a much superior article wherein all the troubles encountered by the use of the gum are eliminated. A machine adapted solely for the heat-sealing process may be much smaller than the older machines.

The principal mechanical difficulty introduced in attempting to use the heat-sealing process in a high speed machine is that the linear travel of the paper, at the rate of 250 to 400 feet per minute, tends to obstruct the application of heat for a sufficient length of time to effect a proper seal.

The provisions of my invention also include the application of transparent window patches for window envelopes and same can be applied to boxes, etc., also by the heat-sealing process, by which a much cleaner patch is applied. In the gum sealed type of window patch, it has been necessary, in gumming the components, to leave an ungummed margin around the edge, so that extrusion of the gum, when moistened and pressed, does not cause sticking of the paper. However, this ungummed margin permits of raw edges which are apt to interfere with the insertion of the material in the completed envelopes. By using heat-sealed patches, a fully attached window patch accrues, which is accurately adhered to the envelope all around its edges, so that no interference with envelope stuffing may occur. Further, the longer the heat-sealed patch remains on the paper, the stronger the bond between the two becomes.

Objects of the invention are to provide apparatus for heat-sealing the flaps of an envelope, either from blanks, pre-treated blanks or rolls, and for heat-sealing patches on window envelopes, at a high rate of speed; to provide heat-sealing mechanism which may be applied to rotary type high speed envelope machines of existing form; to provide certain alternative forms of apparatus by which an adequate time interval is allowed to effect complete heat-sealing of flaps and patches to be joined together, and to provide certain auxiliary processing equipment relevant to the accomplishment of the foregoing objects.

Further objects include the provision of humidity control apparatus to assist the heat-sealing process; the provision of apparatus for chemically treating paper stock, either in cut blanks or rolls, as part of the machine operation, the provision of integral printing equipment on the machine to imprint the envelopes during their manufacture, and the provision of integral cutting dies so that rolls of paper may be fed into the single machine to be processed into complete envelopes. By proper humidity control and other features of my machine, generation of static electricity is minimized by which the fabricating process is made faster and safer.

Other objects and other phases of the invention will become apparent in reading the description of the apparatus in connection with the attached drawings, in which:

Fig. 2 is a diagrammatic representation of the processes applied to envelope blanks as they progress through the machine;

Fig. 3 shows the series of temperature and pressure-controlled rollers and other units in one feasible combination for producing the sequence of envelope processing steps indicated by Fig. 2;

Fig. 4 is an enlarged diagrammatic representation of certain of the heated pressure rollers of Fig. 3;

Fig. 5 is a tabulation showing the relationship of speed, pressure and time flowing from the arrangement of the rollers of Fig. 4;

Fig. 9 is a modification of the heat-sealing apparatus, shown in a diagrammatic form, by which the time interval for holding the patched envelopes may be increased;

Fig. 10 is an enlarged detail elevation showing mechanism for gripping envelopes on the conveyor chains of an envelope machine;

Fig. 11 is a plan of a portion of the conveyor chain shown in Fig. 10;

Fig. 12 is a section through the large drum or roller shown in Fig. 9;

Fig. 13 is a section on the line 13—13 of Fig. 9;

Fig. 14 shows apparatus which may be utilized in connection with the high temperature pressure roller system, such as in Fig. 4, by which humidity of the envelopes in process may be controlled;

Fig. 15 is a view, partly in section, of an electrically heated temperature control rotary patch carrying segment as utilized in the machine;

Fig. 16 is an end elevation of the heated segment of Fig. 15;

Fig. 17 shows another alternative form of apparatus for applying heat, pressure, and time dwell in the heat-sealing process.

Figure 1:
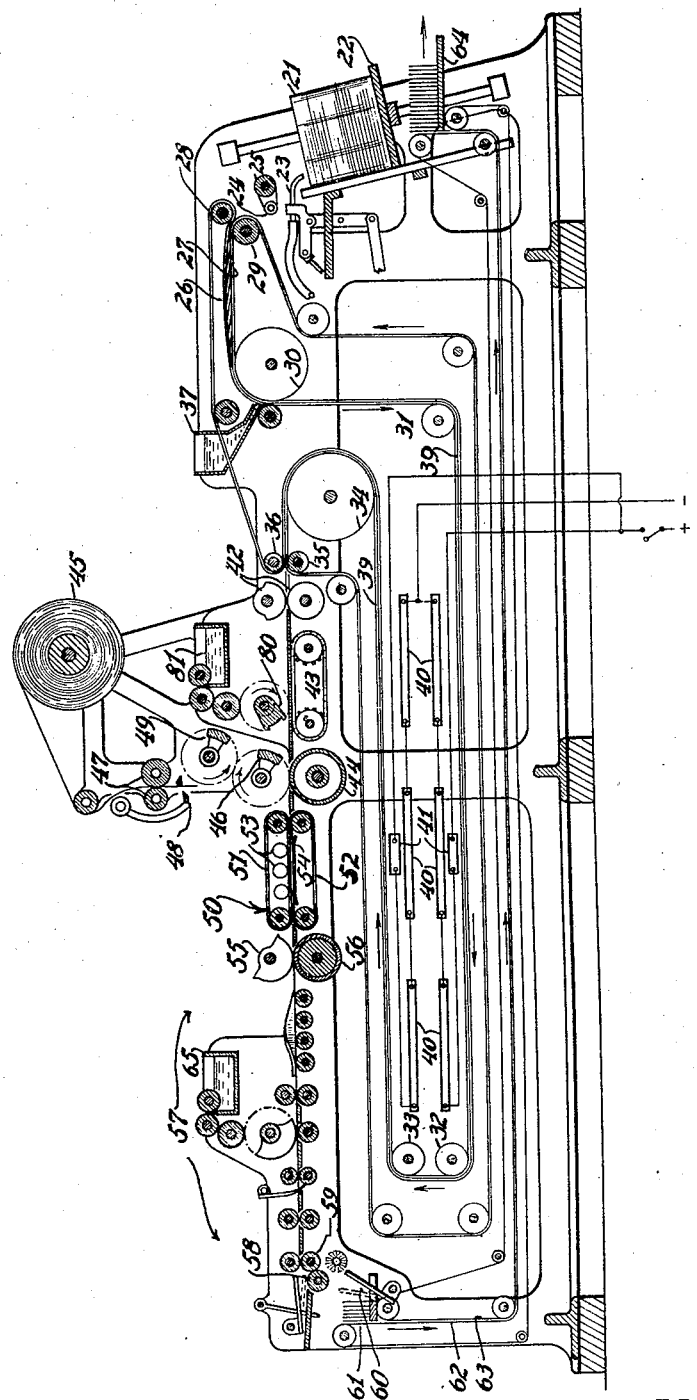
Fig. 1 is a side elevation, more or less diagrammatic, of a rotary envelope machine incorporating certain of the devices of this invention.
Figure 6:
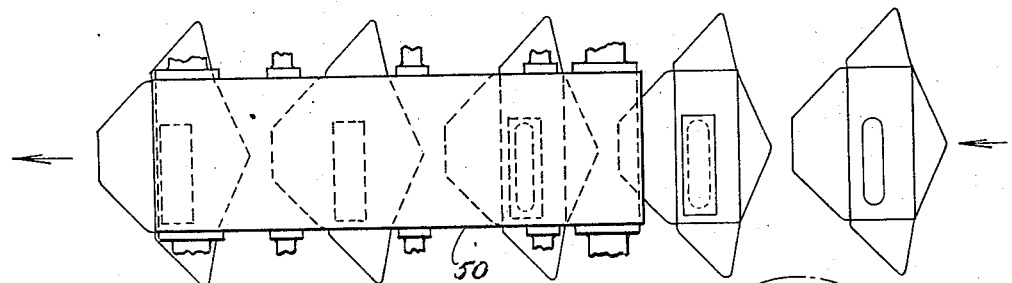
Fig. 6 is a plan of an alternative organization for effecting the same process upon envelope components shown in Fig. 2, by means of an endless flexible metal belt in lieu of a plurality of roller pairs.

Fig. 1 shows the general form of envelope machine with which my invention is adapted to be used. Essentially, it is organized for the older method of gum sealing and certain of the gum sealing components have been shown, although they need not be used when the heat-sealing process is fully carried out. Paper blanks are fed to the machine from the stack 21, but a continuous pre-treated paper roll can be fed into the machine with a die co-functioning in timed relationship for processing. The stack is supported on a table 22, which is raised automatically as paper is delivered from the top of the stack to the machine. A depressible suction finger 23, cam-operated at proper frequency, picks up a single blank and is arranged to pass the leading edge thereof between rollers 24 and 25 which, by proper cam movement, not shown, deliver the leading edge of the blank between belts 26 and 27 of a conveyor system, these belts passing over pulleys 28 and 29. The belts 26 and 27 are run at such a speed with respect to the feeding of envelopes from the stack or rolls, that a certain amount of overlap is given two successive blanks. The belts are held together in their progress over the several pulleys 30, 31, 32, 33 and 34, whence they separate at the rollers 35 and 36, to pass each by itself over suitable pulleys back to the pulleys 28 and 29. In their progress over the pulleys 32 and 34, the envelopes are carried in overlapped relation. A reservoir 37 is shown which carries a wick adapted to coat certain parts of the overlapped envelopes with gum when used), the conveyor system holding the blanks in such a position as to present an unobstructed free part of the paper for gum wiping by the apparatus. When making heat-sealed envelopes, the proper chemical elements necessary to prepare the paper for heat-sealing may be applied from the reservoir 37 rather than the seal gum previously used or the paper may be previously prepared for such heat-sealing, thus eliminating these gum boxes. As the blanks are carried from the pulley 30 to runs 38 and 39 of the belts, they pass over a plurality of heating elements 40, thermostatically controlled by units 41 by which a predetermined temperature is maintained. The elevated temperature at this stage serves not only to dry the gum or chemicals applied to the paper, but also serves to condition the paper for subsequent processing and introduce latent heat into each blank.

The overlapped envelopes are delivered from the conveyor at the rollers 35 and 36, whence they are picked up by a pair of rollers 42, one of which is segmental at its periphery, and both of which rotate so that their peripheral speed is higher than the linear speed of the conveyor. Thereby, the envelope blanks are individually picked from the conveyor and spaced linearly as opposed to their previously overlapped relation. Thence, the blanks are carried on a conveyor unit 43 which may be heated to dry out gum or other material applied thereat, through the station established by the roller 44 whereat, if the envelopes are to be window envelopes, a glassine patch provided from the roll of glassine paper 45, is applied. Presuming the paper has been previously processed for heat-sealing either in or out of the machine, a window patch is applied as the envelope passes through this station, by a segment 46, the details of which will be more fully described later. Suffice it to say at this time that this segment is provided with heating apparatus and with buttons of small area, which "spot weld," as it were, the glassine patch to the envelope blank at a few points for initial location. Glassine patches, properly chemically treated, are delivered from the roll 45, through rollers 47 to a cut-off unit 48, whence they are picked up by a rotating segment 49 for delivery in timed relation to the segment 46. The blank is then passed to the apparatus 50 which, as shown in Fig. 1, comprises a pair of endless belts 51 and 52 having adjacent runs moving in the direction of travel of the envelope blank. A plurality of rollers 53 bear down upon a platen 54 to put the blanks under high pressure as they pass through the belt runs. The rollers 53 are electrically heated to the necessary elevated temperature and, with the pressure, elevated temperature, and time interval during which the blanks are between the belts in their progress therethrough, the glassine window patch is effectively heat-sealed to the envelope blank.

It will be seen that the effective length of the unit 50 along with a greater or lesser number of rollers 53, will determine the time interval during which the envelope blank is placed under pressure at high temperature, in order to obtain effective heat-sealing of the window patch. This unit 50 I have shown in several alternative embodiments which will presently be described. Such units, when the flaps of the envelopes are arranged also to be heat-sealed, may be placed at stations later on in the machine after the folding operations have been accomplished. The organization as shown in Fig. 1, is set up principally for heat-sealing window patches, using gum for the envelope flaps per se, but my invention is not so limited.

As the processed envelope leaves the heat-sealing assembly 50, it is now corrected for lateral location by conventional means, and is passed to creasing rollers 55 and 56, and on through the conventional mechanism for folding the flaps, this mechanism being generally identified by the number 57. As above noted, the creasing and folding may be accomplished prior to the last sealing station whereby the envelope will be completely heat-sealed. The envelope is thus completed, and is delivered from rollers 58 and 59 into a hopper 60 which is organized with a stacking apparatus, 61 designating a stack of completed envelopes. If desired, completed envelopes may be removed from the machine at this point. However, I provide a belt conveyor system, comprising belts 62 and 63 which pick up completed envelopes, carrying them to the right hand end of the machine to a second stacking table 64, so that the finished envelopes are within the operator's reach at a point adjacent that at which the stack of envelope blanks or paper roll 21 is placed. If the envelope to be fabricated is to be completely heat-sealed throughout, that part of the gum reservoir system 65, forming part of the unit 57, is replaced by a system of heat control rollers and flexible metal belts generally similar to the unit 50. The drawings designate only the unit 50 for window patch sealing, for the sake of simplicity, but the invention is not to be limited to this location, for it is obvious to one skilled in the art that such a system may be applied elsewhere in the sequence of fabricating operations. Also, for the sake of simplicity, the various mechanical operating mechanisms for the several assemblies are not shown, as such mechanisms are known in the art. In fact, should a machine be built for complete heat-sealing of envelopes, without any gum-sealing processes, along with imprinting of the envelopes, the machine becomes much more simple than it is at present, and occupies a greatly reduced amount of floor space compared to the former type.

Figure 7:
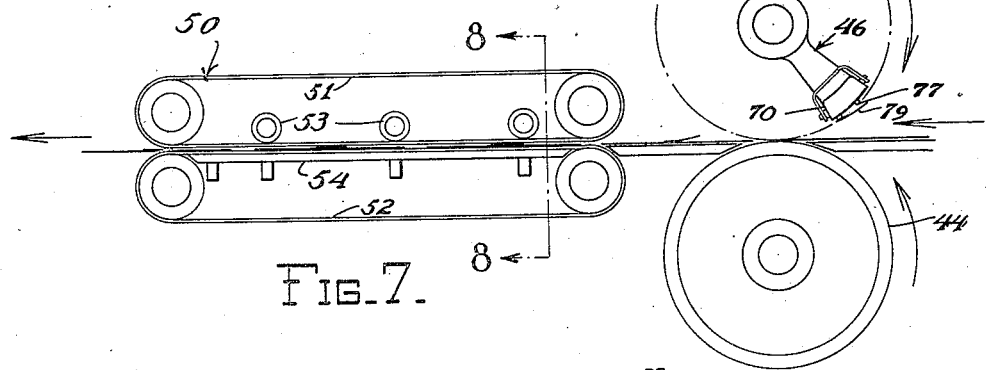
Fig. 7 is a side elevation of the structure of Fig. 6, along with another component of the processing mechanism.
Figure 8:
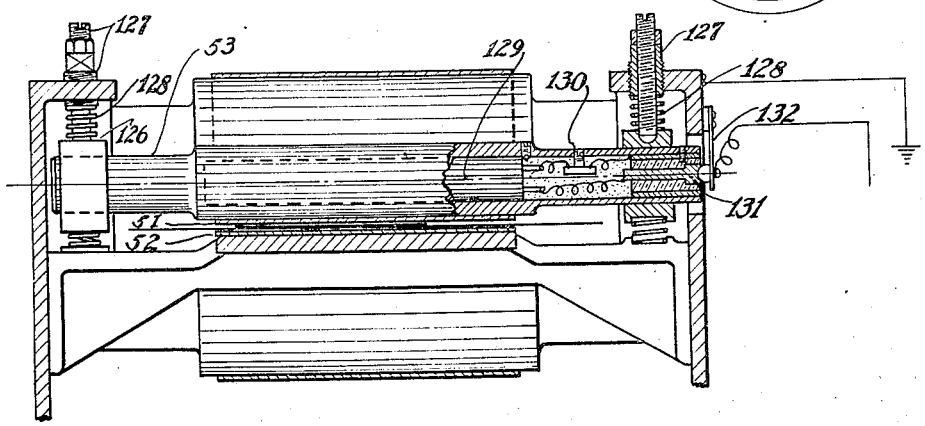
Fig. 8 is an enlarged section on the line 8—8 of Fig. 7.

In Figs. 7 and 8, and also in Figs. 15 and 16, I show parts of the heat-sealing unit 50, and of the segment 46 and related mechanism, to larger scale. Referring to said figures, it will be recalled that the segment 46 serves to place a window patch upon an envelope blank passing thereunder. The segment, as shown in Figs. 15 and 16, comprises a head 70 carrying electrical heater units 71 controlled by suitable built-in thermostats well known in the art. The head 70 is provided with a bore 72 having a plurality of orifices 73 communicating with the working face 74 of the head. The bore 72 is connected with a suitable pneumatic system, not shown, which is arranged to place a suction thereupon at certain intervals during the rotary travel of the segment. The head 70 is screwed to a link 75 forming part of the assembly by means of screws 76, and protrusions 77 are formed on the working face 74 to provide spot sealing means for initial locating of a window patch when same is applied to an envelope blank passing below the mechanism. The head 70 is likewise provided with a cowling 78 screwed thereto, which cowling helps to maintain the elevated temperature at which the head is operated (requiring less heating current), and also serves to make the head aerodynamically cleaner in order that the air flow may not be turbulent during rapid rotation of the segment organization by which paper flowing through this stage of the operation will not be ruffled and unduly cooled.

The functioning of this part of the device may be more readily appreciated by referring to Figs. 1 and 7, Fig. 1 showing the window patch roll 45 and the cut-off mechanism 48 by which cut patches are fed in properly timed sequence to the head 70 as it contacts with the auxiliary segment 49. At such an instant, suction is applied to the bore 72 of the head 70, to retain the window patch against the working face 74, and upon further rotation of the segment 46, the window patch designated as 79 in Fig. 7 is placed upon the envelope blank moving through the mechanism. The protrusions 77, maintained at elevated temperature by the heater units 71, firmly press the window patch upon the pre-processed envelope blank for a short time interval. However, this time interval is sufficient to cause an effective spot seal at the few points represented by the number of protrusions 77 on the head 70, and due to their reduced area, the pressure may be high and this initial seal then locates the window patch on the envelope blank to prevent inadvertent displacement thereof as the blank proceeds to the heat-sealing mechanism 50. Incidental to the foregoing process it will be appreciated that the roller 44 below the segment 46 is rotated at such a speed that its peripheral velocity is the same as the peripheral velocity of the working face 74 of the segment 46 so that, as the protrusions 77 address the envelope blank, the roller 44 forms the reaction member against which the protrusions press the envelope blank and window patch. The segment 70, as shown in Figs. 15 and 16, is particularly organized for spot heat-sealing window patches, but if desired, the conventional gum sealing process may be utilized for spot-sealing the patch, in which process, referring to Fig. 1, a segmental member 80 would be arranged to pick up gum from a reservoir 81 to apply spots of gum to the envelope blank passing therebelow, prior to the application of the window patch from the segment 46.

Fig. 4 shows an alternative heated roller organization to produce a result equivalent to that produced by the heat-sealing unit 50. This includes pairs of rollers comprising an upper roller 83 and a lower roller 84, the several pairs of rollers being indicated as 5, 5a, 5b, 5c, 5d and 5e. Each roller is provided with a conventional slip ring organization indicated at 85 by which electric current is fed from the circuit 86 to energize heating coils within each roller. The bottom roller can be relieved, if necessary, to prevent the patch from sticking, although normally there is a two or three thousandths of an inch clearance— the thickness of the paper blank. The several rollers 83 above the work table, represented as 87, are driven at a uniform peripheral speed S, which corresponds to the rate of travel of the envelope blanks being processed, through the machine. The lower rollers 84 which may be surface recessed to prevent patch sticking as previously mentioned, on the other hand, are driven at varying speeds, the relationship of the speeds of the lower rollers to the speeds of the upper rollers being shown in the tabulation of Fig. 5. When an envelope blank enters between the roller pair 5, the blank is traversed at the nominal linear speed of travel of work through the machine. On reaching the roller pair 5a, the lower roller is rotating at slightly less than the speed of the upper roller, whereby an ironing effect is produced to more adequately press the envelope elements to be sealed into firm contact. In the next roller pair 5b, the roller speeds are identical; in the next roller pair 5c, the lower roller runs at slower speed than the upper; in the roller pair 5d, the lower roller runs faster than the upper roller, by which any lag caused by the prior set is made up while still producing an ironing effect on the work passing between the rollers. The final set of rollers 5e run at the same speed S, so that the work delivered through the assembly is being traversed at the proper speed. It is found expedient to effect variations in pressure upon the rollers, these pressure differences also being tabulated in Fig. 5 wherein $p$ represents a datum pressure applied on the roller pair 5, whereas $x$ and $y$ represent pressure factors appropriately selected by which pressure between the various rollers may be varied. Fig. 2 represents in plan the various stages of envelope processing as an envelope blank progresses through the heat-sealing stages of the envelope machine, while Fig. 3 represents the specific elements of the machine which contribute to the cumulative processing steps imposed upon those envelope blanks shown in Fig. 2, at the various stations of progress of the envelope blank. Station 5 corresponds to the heat and pressure roller system 50' similar to that shown in Fig. 4, while stations 1 to 4, inclusive, correspond to the processing steps effected by the elements 35, 36, 42, 80, 44 and 46 in sequence. Stations 7 and 8 correspond to those process steps accomplished by the assembly 57, shown in Fig. 1, namely, scoring and folding the envelope flaps. At 90, I show a pair of envelope blanks in parallel relationship with the normal line of envelopes, this representing a by-passing of alternate envelope blanks by which the individual blanks travel at half the normal speed to acquire certain processing, after which they are returned to the main processing line to receive subsequent process steps at the full rate of travel of the processing line.

Fig. 14 shows an adjunct to the roller apparatus 50' or its equivalent, wherein a box 92 is placed around the roller system 50', the interior of the box being maintained at an elevated temperature by a heater 93 and being maintained under appropriate conditions of humidity by baths 94 and 95 provided with heaters 96 for evaporation of water or other material contained in the baths. Thereby, controlled conditions of temperature and humidity are maintained to favor effective processing of the envelope blanks passing through the housing 92. This humidity control also serves the extremely useful function of reducing static electricity.

In Fig. 17 I show an alternative arrangement for effecting the pressure and temperature process for heat-sealing envelope blanks. In this arrangement, a large size roller 97 is provided with means for heating same which, as shown, comprises either or both a vapor heating organization 98 or an electric heater. A pair of rollers 99 and 100 are provided with an endless belt 101 which passes over the roller 97 in such a manner that envelope blanks fed to the roller and belt combination are maintained in contact with the large roller 97 for a relatively long period of time. The pressure imposed between the belt 101 of the roller 97 is determined by the tension in the belt 101, controllable by proper adjustment of the axes of the rollers 99 and 100. By this arrangement, an adequate heat and pressure can be imposed upon the envelope blanks to effect proper processing.

Fig. 9 also shows a belt and roller combination more or less analogous to that shown in Fig. 17; however, in this instance, two continuous belts 103 and 104 are utilized, the envelopes being fed between the two belts at 105, after which the belts run together, with envelope blanks between them, over a heated roller 106. A plurality of pressure rollers 107 bear upon the outside of the belt 103 to effect the necessary pressure relationship. Other idler rollers are provided, as shown, to guide the belts and to maintain the envelope blanks therebetween in proper relation. Space is here provided for introducing printing apparatus so the blanks can be printed as they pass over this station. An extended run of the two belts 103 and 104 is shown at 108, this run being suitably housed in an atmosphere of humid warm air to process the envelope blanks over a protracted period of time.

Figs. 10 and 11 show a novel conveyor chain organization for envelope machines adapted for at times firmly holding envelope blanks upon the chain, and for at other times, loosening the envelope blanks with respect to the chain by which certain process steps or position transfers may be effected. A chain 110, which would be one of a pair, is provided with spaced pins 111 forming abutments against each of which the edge of an envelope blank 112 is adapted to rest as the chain is translated through processing stages. For each pin 111, a clip 113 is hinged at 114 to the chain, this clip having an upper arm 115 arranged for engagement with an envelope blank, to press the latter against the chain. The clip is also provided with a lower, somewhat similar arm 116, which is adapted to travel behind the clip pivot 114. Attached to the bed of the machine is a cam bar such as 117 having certain portions 118 in elevated positions close to the chain 110. When the clips are over this elevated portion 118, the arm 116 is raised, causing the arm 115 to firmly clamp the envelope blank against the chain. The cam bar is provided with depressed portions 119 whereat the clip arm 116 may drop with respect to the chain, thereby receiving the clip arm 115 from the chain to loosen the envelope blank carried thereat. This clip organization may be utilized at various stages on a continuous type of envelope machine and by its use, perfect control of envelope blanks in process may be obtained. The utility of this clip arrangement will be obvious to those skilled in the art, and its application in either new or existing types of envelope machines will be apparent.

Figure 18:
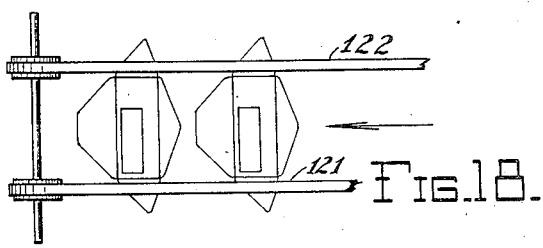
Figs. 18 and 19 are, respectively, plans and front elevations, the latter partly in section, of a conveyor system for carrying envelope blanks.
Figure 19:
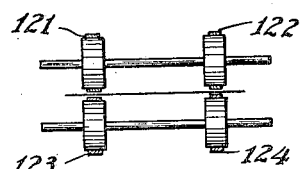

Figs. 18 and 19 show another form of conveyor belt arrangement which is useful in transferring either processed or unprocessed envelope blanks from one station to another. Herein, two pairs of laterally spaced belts 121, 122, 123 and 124 are arranged to run over rollers and are so spaced laterally that certain elements of envelope blanks are gripped between the belts 121 and 123, while other portions of the same blanks are gripped between the belts 122 and 124. An advantage flowing from the use of spaced narrow belts or the chain is that processing steps on the envelope blanks can be effected by apparatus arranged between the belts without discharging the blanks from the conveyor system so that the blanks are always maintained at a uniform rate of travel through the machine.

Fig. 8 is an enlarged view, partly in section, showing one of the pressure rollers 53 forming a part of the unit 50 by which envelope blanks are subjected to heat and pressure for heat-sealing various elements of the envelopes to one another. Referring to Fig. 8, the roller 53 is carried in bearings 126 which are vertically adjustable by screws 127, springs 128 being arranged between the screws 127 and the bearings 126 so that, although a substantial pressure may be imposed upon the roller through the medium of the spring, the roller may accommodate itself readily in a vertical direction in accordance with the thickness of the paper which may be passing between the belts 51 and 52 running under the roller. As indicated previously, the rollers 53 are provided with electrical heaters 129, one terminal of which may be grounded as at 130, and the other terminal of which may be connected to a contact piece 131 coaxial with the roller, this contact piece 131 in turn being contacted by a wiper brush 132 in circuit with a power source. The bottom rollers can be relieved where necessary to prevent glassine sticking as previously stated, as they all run in timed relationship to the moving blank.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a high speed rotary envelope machine, means for sealing elements of an envelope blank arranged in overlapping engagement comprising a plurality of pairs of rollers the pairs being in tandem relationship, and the points of normal contact of the rollers of each pair lying in the plane of the normal points of contact of the rollers of other pairs, means for driving the several rollers at divergent rotational speeds, means to heat said rollers, and means to feed envelope blanks between the rollers of the first pair.

2. In a high speed envelope machine, means for sealing elements of an envelope blank arranged in overlapping engagement comprising a plurality of rollers substantially tangent to a plane and rotating in the same direction, a second, similar plurality of rollers, each tangent to one of the first said rollers and tangent to said plane, said second plurality of rollers rotating in opposite sense to the rollers of said first plurality, means for rotating said rollers in the specified sense but at variant speeds, means to heat said rollers, and means to feed the envelope blank between the rollers.

3. In high speed envelope processing, the method consisting of passing a series of tandem arranged blanks at a certain speed, linearly, along a processing table, the process taking a longer time interval than said certain speed will allow, by-passing alternate blanks into a second, slower moving processing line, slowing down those blanks in the original processing line at the station for said process, processing both lines of blanks at the reduced speed, then accelerating the original line and reinserting the blanks of the second line between the blanks of the original line.

4. In an envelope machine of the rotary type adapted to produce window envelopes, a processing table along which blanks are moved at certain speed, timed means for carrying and applying window patches to and upon the envelope, the patches and blanks being adapted for heat sealing, said timed means including a rotating segment having heating means and projections thereon for spot fastening restricted areas of the window patch upon the blank at a frequency consistent with the normal travel of the blank to initially hold the patches to the blanks, and a plurality of pairs of opposed heated rollers between which the blank and patch are passed after said spot fastening to effect an adhesion of the entire overlapped area of the patch and blank.

5. In a high speed envelope machine, a processing table along which blanks in process pass at certain speed and in a single line, said machine having a process step requiring a greater time interval for accomplishment than that permitted by normal speed of the blanks, means to separate alternate blanks, parallel processing units for said process step, through which alternate blanks are passed at reduced speed, and means for returning the alternate blanks to the processing table in a single line.

6. In a high speed envelope machine, means for sealing pretreated overlapping elements of paper blanks the treatment effecting adhesion therebetween by the imposition of heat and pressure, comprising a processing station including a plurality of pairs of heated tangent rollers arranged for passage of the blanks therebetween, the rollers of each pair rotating oppositely, means to drive said rollers at differential speeds whose average peripheral speed equals the average speed of the paper blanks through the roller system, means to resiliently press the rollers of each pair toward one another, and means to carry said blanks through the roller station at said average speed.

7. In an envelope machine of the rotary type adapted to produce window envelopes, a processing table along which blanks are moved at certain speed, timed means for carrying and applying window patches to and upon the envelope, the patches and blanks being adapted for heat sealing, said timed means including a rotating segment having heating means and projections thereon for spot fastening restricted areas of the window patch upon the blank at a frequency consistent with the normal travel of the blank to initially hold the patches to the blanks, substantially parallel sets of heated rollers, operating at a peripheral speed less than said certain speed of the processing line, and means to divert alternate blanks to one and the other roller set, the alternate blanks passing through respective roller sets to effect an adhesion of the entire overlapped area of the patch and blank.

EDMUND B. MOORE.